(12) United States Patent
Dreher

(10) Patent No.: US 9,647,499 B2
(45) Date of Patent: May 9, 2017

(54) ELECTRIC MACHINE

(71) Applicant: SEW-EURODRIVE GMBH & CO. KG, Bruchsal (DE)

(72) Inventor: Florian Dreher, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 482 days.

(21) Appl. No.: 14/374,093

(22) PCT Filed: Jan. 21, 2013

(86) PCT No.: PCT/EP2013/000171
§ 371 (c)(1),
(2) Date: Jul. 23, 2014

(87) PCT Pub. No.: WO2013/110450
PCT Pub. Date: Aug. 1, 2013

(65) Prior Publication Data
US 2015/0015092 A1 Jan. 15, 2015

(30) Foreign Application Priority Data

Jan. 23, 2012 (DE) ........................ 10 2012 001 115

(51) Int. Cl.
*H02K 1/06* (2006.01)
*H02K 1/14* (2006.01)
(Continued)

(52) U.S. Cl.
CPC ............. *H02K 1/145* (2013.01); *H02K 15/02* (2013.01); *H02K 1/02* (2013.01); *H02K 3/525* (2013.01);
(Continued)

(58) Field of Classification Search
CPC ........ Y10T 29/49009; Y10T 29/49078; H02K 1/148; H02K 3/522; H02K 1/146; H02K 21/16; H02K 1/145
(Continued)

(56) References Cited

U.S. PATENT DOCUMENTS 6,946,771 B2   9/2005   Cros et al.
6,965,179 B2   11/2005  Willmer et al.
(Continued)

FOREIGN PATENT DOCUMENTS

DE   10 2005 020 952   11/2006
DE   10 2007 017 050   10/2007
(Continued)

OTHER PUBLICATIONS

International Search Report, dated Jul. 7, 2014, issued in corresponding International Application No. PCT/EP2013/000171.
(Continued)

*Primary Examiner* — Thanh Lam
(74) *Attorney, Agent, or Firm* — Andrews Kurth Kenyon LLP

(57) ABSTRACT

An electric machine, especially a transversal flux machine, the stator being composed of a stack of phase segments, each phase segment having at least one stator segment and one stator winding, especially a single winding, each stator segment having an annular stator bridge, on which pole shoes are premolded, which in particular extend radially inward, and/or which extend in the direction of the rotor and/or which are situated between the rotor and the annular stator bridge, the pole shoes having the same shape, in particular, the axial width of the pole shoe decreasing with increasing radial clearance, the associated profile being disposed between a first and a second profile, the first profile being a linear function of the radial clearance, the pole back (Continued)

associated with the first profile being a planar area, in particular, the second profile being a circular function, in particular a circular segment function, the pole back associated with the second profile being a cylindrical section area, in particular.

24 Claims, 9 Drawing Sheets

(51) Int. Cl.
*H02K 37/14* (2006.01)
*H02K 3/52* (2006.01)
*H02K 15/02* (2006.01)
*H02K 1/02* (2006.01)

(52) U.S. Cl.
CPC ........... *H02K 15/022* (2013.01); *H02K 37/14* (2013.01); *H02K 2201/06* (2013.01); *H02K 2201/12* (2013.01); *H02K 2213/03* (2013.01); *Y10T 29/49009* (2015.01)

(58) Field of Classification Search
USPC ............... 310/216.072–216.074, 216.091, 310/216.093–216.094, 216.001–216.137, 310/257; 29/596
See application file for complete search history.

(56) References Cited

U.S. PATENT DOCUMENTS

| | | | |
|---|---|---|---|
| 7,649,298 B2 | 1/2010 | Enomoto et al. | |
| 7,696,661 B2* | 4/2010 | Holmes | H02K 1/145 310/112 |
| 7,977,844 B2* | 7/2011 | Takeda | H02K 1/243 310/162 |
| 8,056,211 B2 | 11/2011 | Holmes et al. | |
| 2002/0070627 A1* | 6/2002 | Ward | H02K 1/145 310/254.1 |
| 2007/0090720 A1 | 4/2007 | Aoki et al. | |
| 2007/0145854 A1 | 6/2007 | Enomoto et al. | |
| 2009/0184599 A1* | 7/2009 | Kanazawa | H02K 1/148 310/195 |
| 2010/0253178 A1* | 10/2010 | Koyama | H02K 1/14 310/216.113 |
| 2011/0062817 A1* | 3/2011 | Makiyama | H02K 1/145 310/216.054 |
| 2012/0013209 A1 | 1/2012 | Ramon et al. | |

FOREIGN PATENT DOCUMENTS

| | | |
|---|---|---|
| EP | 1 420 503 | 5/2004 |
| EP | 2 006 977 | 12/2008 |
| EP | 2 006 978 | 12/2008 |
| EP | 2 573 918 | 3/2013 |

OTHER PUBLICATIONS

International Preliminary Report on Patentability, dated Sep. 22, 2014, issued in corresponding International Application No. PCT/EP2013/000171.

* cited by examiner

ELECTRIC MACHINE

FIELD OF THE INVENTION

The present invention relates to an electric machine.

BACKGROUND INFORMATION

It is common knowledge that electric machines have a stator and a rotor, which is rotationally mounted in relation thereto and includes an active component. Multiple magnetic alternating fields are superposed to form a rotating field, so that a rotary motion is produced in a reciprocal action with an excitation field.

SUMMARY

Therefore, the present invention is based on the objective of further developing an electric machine in a compact manner, the production of which can be carried out in an uncomplicated manner.

Important features of the invention in terms of the electric machine, especially a transversal flux machine, are that the stator is composed of a stack of phase segments, each phase segment has at least one stator segment and one stator winding, especially a single winding, each stator segment has an annular stator bridge, on which pole shoes are premolded, which in particular extend at a right angle to the bridge, i.e., in the radially inward direction, and/or which extend in the direction of the rotor and/or which are situated between the rotor and the annular stator bridge, the pole shoes have the same shape, in particular, the axial width of the pole shoe decreases with increasing radial clearance, the associated profile is disposed between a first and a second profile, the first profile is a linear function of the radial clearance, the pole back associated with the first profile being a planar area, in particular, the second profile is a circular function, in particular a circular segment function, the pole back associated with the second profile being a cylindrical section area, in particular.

This has the advantage that, although the first profile would be easy to produce, there is the risk that at field intensity values that do not yet lead to saturation of the air-gap-side surface of the pole shoe, an at least partial saturation of the pole shoe is reached. This is the case because the linear transition is not bulbous or convex. On their way from the air-gap-side surface of the pole shoe to the stator bridge, the field lines must therefore pass through a constriction, and given a corresponding field strength, then cause saturation in this constricted region.

Because of the bulbous shape, the constriction is widened, and saturation is therefore avoided.

However, the bulbous shape is advantageously less bulbous than the second profile. For if the bulbous form of the second profile is exceeded, the winding space available for the stator winding becomes smaller, and the output of the electric machine is reduced, which therefore prevents a compact design.

For the present invention offers a compact solution, i.e., high drive power and high torque per unit volume of the electric machine.

That is to say, the present invention teaches that the bellied profile should be provided, but be below the boundary profile described by the second profile.

The deflection of the field lines is from the air-gap-side side of the pole shoe, which is broader in the axial direction than in the circumferential direction, in the direction of the stator bridge, the transition area from the pole shoe into the annular stator bridge being larger in the circumferential direction than in the axial direction.

The described shape of the pole shoe, especially the form profile of the pole shoe back, enables an essentially constant flux density on the pole shoe surface on the side of the air gap. This improves the regulation characteristics, and a high torque is achievable at the most compact design possible.

Another advantage is also an improvement in the mechanical stability, and thus also reduced noise generation and a reduced oscillation tendency.

In an advantageous manner, no magnetic rotating field is required in the present invention.

In one advantageous development, the pole shoe of a stator segment, especially the first stator segment, has a planar design on its side facing away from the other stator segment of the phase segment, especially in order to allow the tightest and contacting design of the stack of phase segments. This has the advantage that the phase segments are tightly stackable next to each other, and a compact design is therefore able to be achieved.

In one advantageous development, the associated profile of the axial width as a function of the radial clearance is made up of two segments that are not parallel with each other, each being a linear function of the radial clearance;

in other words, the pole back is composed of two planar surface pieces, in particular, which are not parallel with each other, which advantageously makes for an uncomplicated production.

In one alternative advantageous development, the associated profile of the axial width as a function of the radial clearance is made up of one bulbous and/or convex section and one concave section, the concave section having an arc length that is at least five times shorter than the other section. This advantageously reduces the risk of edge fractures, and requires no piercings or the like. Appropriate machining production methods or sinter methods can be used to produce the radii.

In one advantageous development, the air-gap-side surface of the pole shoe has an area value of essentially the same magnitude, or an area value that differs by maximally 20% in comparison with the transition area toward the stator bridge. In this context it is advantageous that the field lines are not subjected to a constriction and thus no saturation occurs.

In one advantageous development, the pole shoe has a pole back, the pole back in particular faces at least partially in the direction of the stator winding and/or at least partially in the direction of the other stator segment, the pole back connects the air-gap-side area of the pole shoe facing the rotor, with the stator bridge, especially the stator bridge surface, the pole back has a bulbous shape and is composed of two planar surface pieces that are not parallel with each other. This advantageously reduces the risk of edge fractures.

In one advantageous development, the pole shoe is formed in such a way that essentially no subregion of the pole shoe goes into saturation as long as the surface area of the side surface of the pole shoe on the side of the air gap, i.e., especially the side facing the rotor, does not go into saturation yet. This has the advantage that no constriction arises for the field lines and the efficiency of the electric machine is therefore as high as possible.

In one advantageous development, the pole shoe has a width in the circumferential direction that increases with increasing radial clearance, it being the case, in particular, that with increasing radial clearance, the width increases in the circumferential direction, in particular in inverse proportion, essentially to the extent that the axial width decreases. This has the advantage that the field lines are deflectable from the air-gap-side pole shoe surface, which is broad in the axial direction, into the transition area, facing toward the stator, of the pole shoe, which is broad in the circumferential direction, without the field lines having to pass through a constriction, without the winding space for the stator winding being reduced, and without the air gap between the stator segments of a same phase segment becoming smaller.

In one advantageous development, the pole shoe is formed symmetrically with respect to a plane of symmetry, the plane of symmetry running through the center of mass of the pole shoe and being defined by the radial direction starting at the center of mass, and the axial direction. In one alternative advantageous development, the pole shoe is symmetrical with respect to a plane of symmetry, the plane of symmetry running through the center of mass of the pole shoe, and the direction of the surface normal being the tangential direction at the center of mass. This has the advantage that the stator segments of a phase segment are able to be realized in an identical manner and thus only one part instead of two needs to be stocked by the warehouse.

In one advantageous development, an edge of the pole shoe has a broader shape. This has the advantage that the risk of an edge fracture is able to be reduced.

In one advantageous development, the area value of the surface of intersection of the pole shoe with respect to a first area, is essentially equal to the area value of the air-gap-side side surface, i.e., the side surface facing the rotor, of the pole shoe, or at least deviates by less than 10% or 20%.

the first surface being a tangential plane, which has the individual radial clearance with respect to the rotor shaft axis, and/or which is aligned parallel with the rotor shaft axis, and/or which has the radial clearance and/or which is aligned perpendicular to the axis of symmetry and/or whose direction of the normal connects the rotor shaft axis to the center of mass of the pole shoe, or the first area being a cylinder sleeve area that has the individual radial clearance with respect to the rotor shaft axis and/or which is aligned parallel to the rotor shaft axis.

This has the advantage that a saturation of the material of the pole shoe is avoidable, as long as the air-gap-side surface of the pole shoe, or the corresponding areas that are close to the surface, have not yet gone to saturation.

In one advantageous development, the stack is accommodated in a housing component, the housing component in particular has an axially extending cable channel, especially an axially extending depression on its surface facing the stack, especially the inner surface, the housing component in particular is connected to the stack in a force-locking manner, the housing component is thermally shrink-fitted to the stack, in particular. This has the advantage that a firm connection may be created in an uncomplicated manner.

In one advantageous development, each stator segment has two radially extending depressions, especially slots, which are set apart from each other by one half of the pole shoe clearance in the circumferential direction, so that in particular when joining two stator segments to form the individual phase segment, the slots are able to be brought into congruence to form a passage for the incoming and/or outgoing line of the individual stator winding. This has the advantage that two substantially identical stator segments are joinable into one phase segment and the slots are able to be brought into congruence in the process. For the stator segments are rotated relative to each other during the joining, so that a particular pole shoe of the first stator segment is positioned between pole shoes of the second stator segment in the circumferential direction, in the same radial clearance range.

In one advantageous development, the stator segment is made from pressed or sintered iron powder. This has the advantage that a simple and cost-effective production of the stator segment in one piece is possible.

Important features of the method for producing an electric machine are that during the production of the stack, a production machine detects and/or uses the slots for aligning, especially adjusting, the relative angle of rotation of the phase segments with respect to each other. This advantageously allows an especially uncomplicated production.

DETAILED DESCRIPTION

Figure 1:
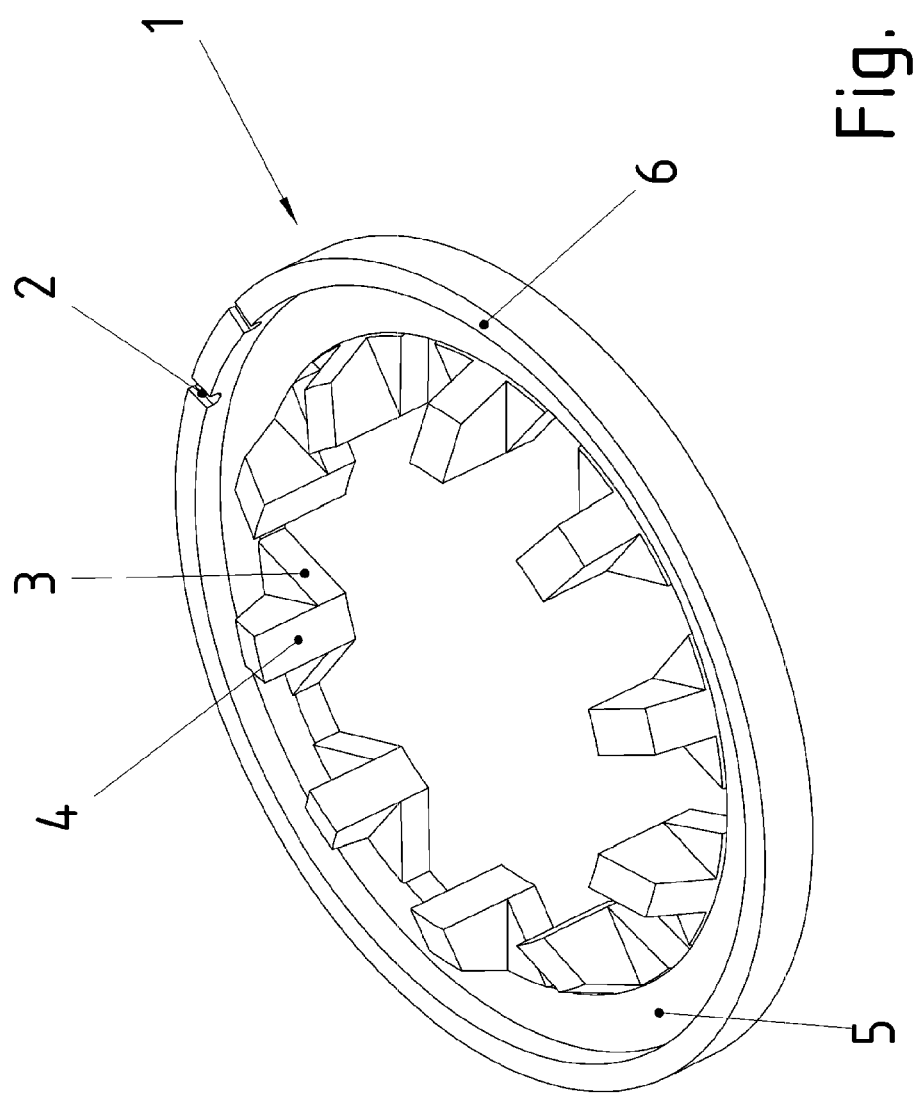
FIG. 1 shows an oblique view of a stator segment 1 of an electric motor according to the present invention.
Figure 2:
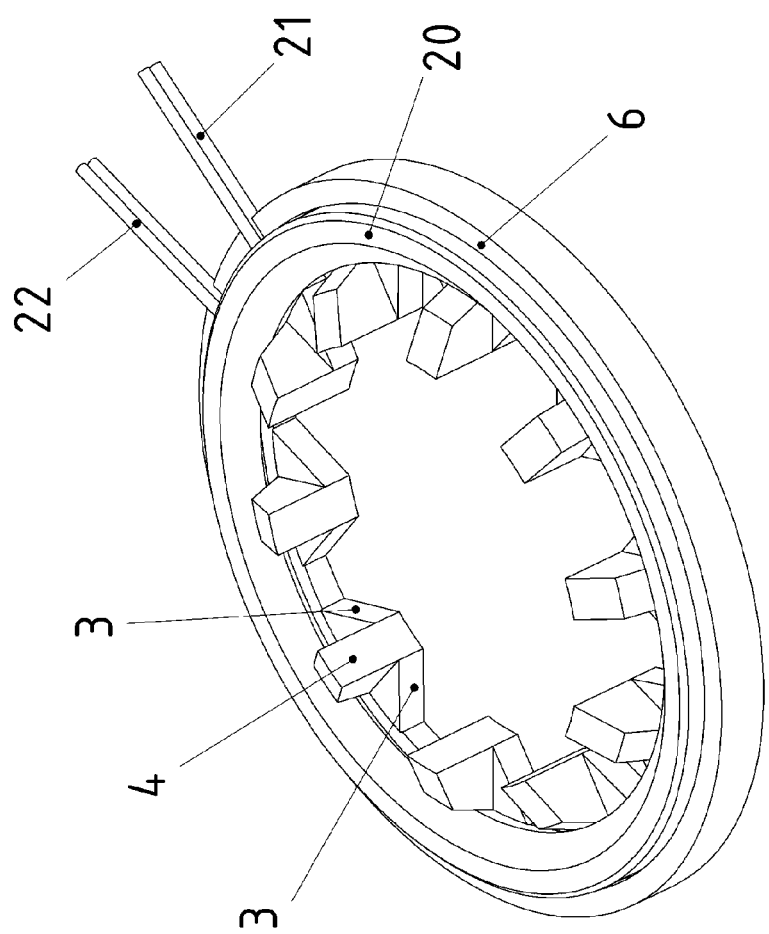
FIG. 2 shows another, substantially identical stator segment 1 of the electric motor according to the present invention, in an oblique view, in which a stator winding 20 in the form of a ring winding is inserted radially between the pole shoes and stator yoke 6.

As illustrated in FIG. 1, stator segment 1 has pole shoes, which are pointing radially inward, i.e., toward the rotor (not shown), and which are evenly spaced apart in the circumferential direction.

The pole shoes are fixated by an annular stator bridge 5, which has a stator yoke 6 that axially projects at its radially outer end region, that is to say, in the direction of the rotor shaft axis.

The radially inward pointing area 4 of the pole shoe, i.e., the side of the pole shoe facing the air gap between stator and rotor, is planar or curved; i.e., using a radius that corresponds to the radius of the stator inner bore.

The active component of the rotor provided on the rotor and facing area 4, for example, may include permanent magnets, which are placed at regular intervals in the circumferential direction, the magnetization direction of permanent magnets situated closest to each other in the circumferential direction being aligned in mutual opposition.

Instead of permanent magnets, it is also possible to use appropriately disposed electromagnets which include an excitation winding. As a further alternative, it is also possible to use a short-circuit cage or a reluctance rotor as active component.

The active component, especially the permanent magnets or electromagnets, essentially has similar axial dimensions, or the same width extension, as the pole shoes. This makes it possible to obtain a high efficiency factor.

Starting from area 4, the transition region toward stator bridge 5 has a broadened region on the side, which extends in and counter to the circumferential direction. The width of the widened region provided in the circumferential direction becomes greater with increasing radial clearance.

Pole shoe back 42 has a bulbous design, but to simplify the illustration, the bulbous form in FIGS. 1, 2, 3, 4, 5, 6, 7 is shown in the form of two planar area segments.

Lateral broadening 3 and the bulbous profile of pole shoe back 42 are adapted to each other, in such a way that the magnetic field entering at areas 4 is introduced into the stator bridge without concentration of the field lines in the pole shoe. That is to say, the pole shoe is shaped in such a way that at least essentially no subregion of the pole shoe goes into saturation as long as no saturation occurs in the surface region of area 4.

In other words, as long as the magnetic field intensity at area 4 remains below the value that is critical for the occurrence of saturation, no saturation will occur in the pole shoe either. The pole shoe thus has enough material for conducting the field lines. However, the shape of the pole shoe is selected such that as much winding space as possible remains for stator winding 20. In addition, a sufficiently large air gap also remains in relation to the pole shoes of further stator segment 1, which forms a stator phase segment together with first stator segment 1 according to FIG. 3.

It is also important in this context that area 4 axially extends to such an extent that it basically covers the axial region covered by the stator phase segment. This ensures maximum utilization.

Since the axial extension of area 4 is greater in the axial direction than the extension in the circumferential direction, the pole shoe deflects the field lines in the direction of the transition to stator bridge 5, to a surface of equal size, but one that has a greater extension in the circumferential direction than in the axial direction. Generally speaking, the field lines are deflected in the form of a spiral, so to speak. However, in this deflection, there is always enough material along the path of the field lines to basically prevent saturation from occurring anywhere in the pole shoe.

That is to say, from radially inside to radially outside, the pole shoe is shaped in such a way that, in essence, the pole back becomes axially narrower to the extent that the pole shoe widens along the side, i.e., in the circumferential direction. The precise form of the pole shoe is selected to allow an uncomplicated production.

Figure 4:
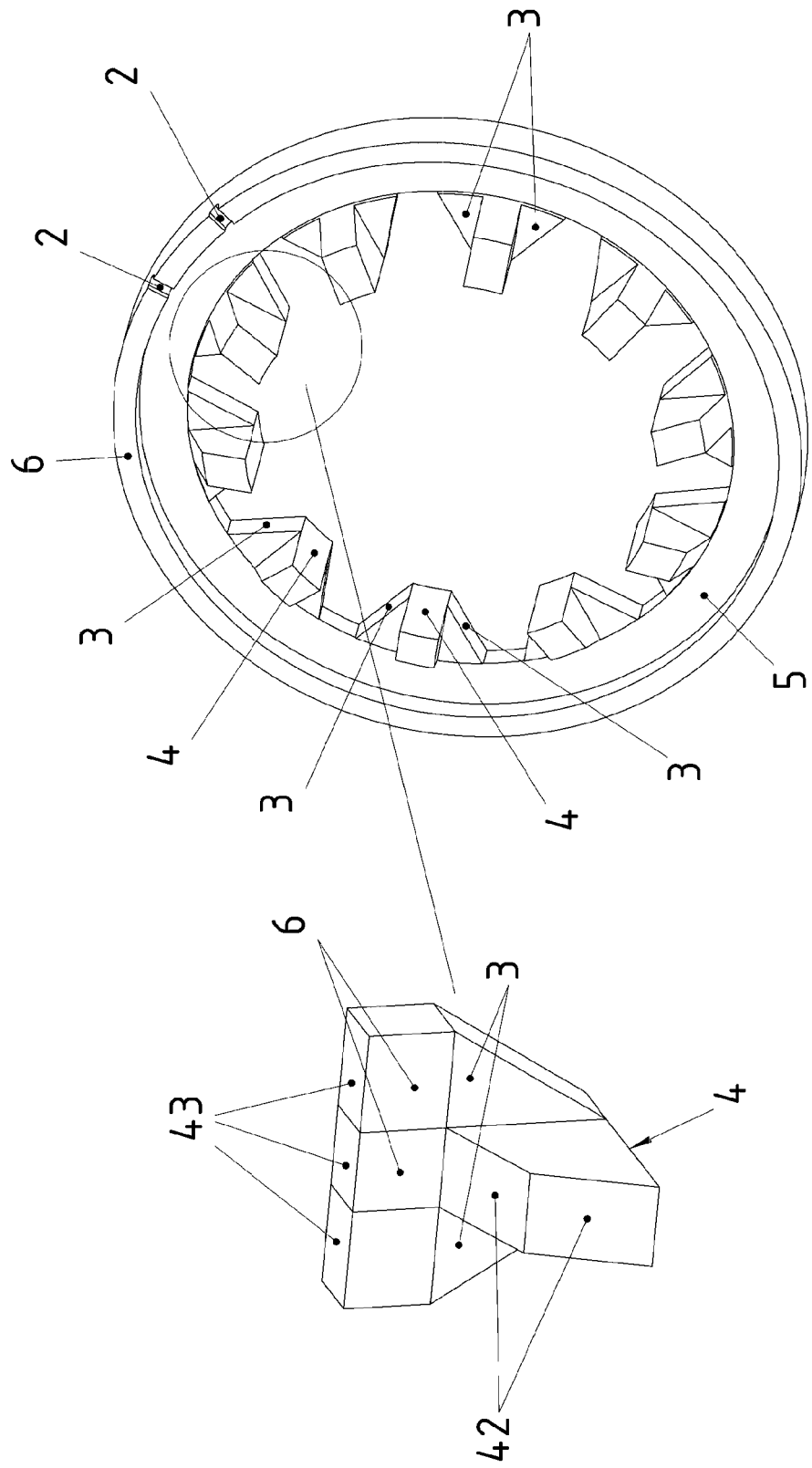
FIG. 4 shows the stator segment according to FIG. 1, which features pole shoes that are directed radially inward and situated at regular intervals in the circumferential direction, a pole shoe, illustrated in a simplified manner, being shown in an enlarged view.

FIG. 4 shows a transition area 42 into which the field lines are rerouted starting from area 4. Although transition area 42 is developed parallel to area 4, it has a greater extension in the circumferential direction than in the axial direction, whereas area 4 has a greater extension in the axial direction than in the circumferential direction.

Stator segment 1 is produced from a magnetizable material, such as pressed or sintered iron powder (SMC), and developed as a single piece or composed of multiple pieces.

Figure 3:
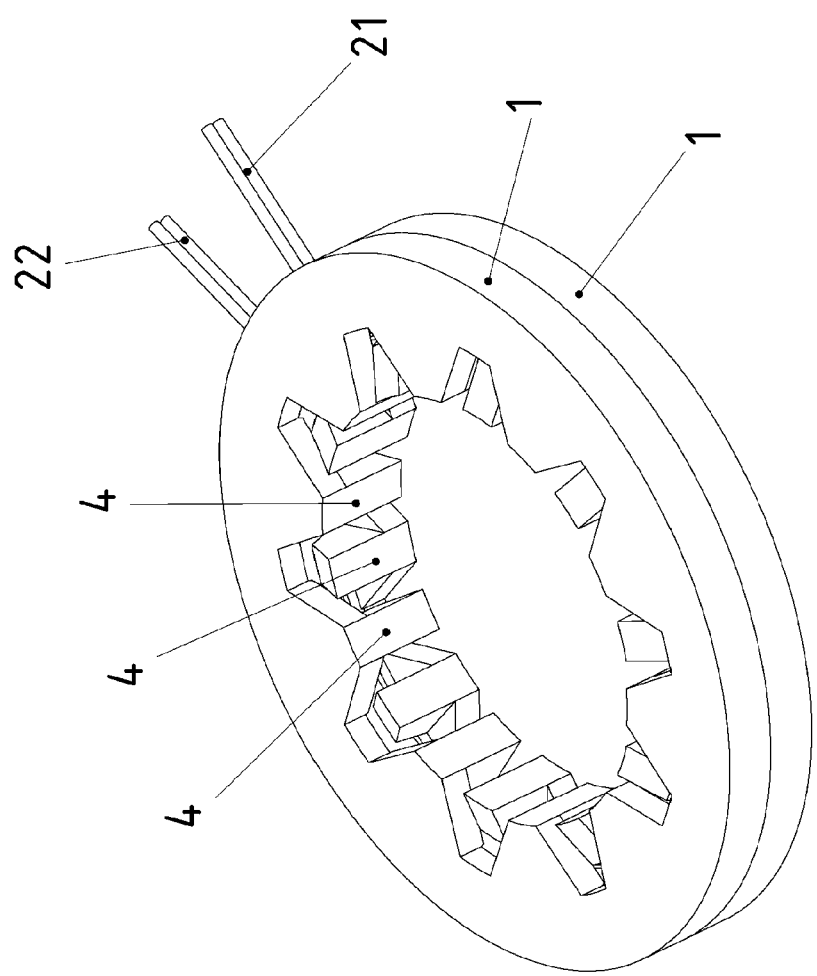
FIG. 3 shows an oblique view of a stator phase segment of the electric motor, the stator phase segment being created by joining stator segments 1 of FIG. 1 and FIG. 2.

As illustrated in FIG. 3, two stator segments 1 of identical shape are joined, and a stator winding 20, developed as ring winding, is inserted in the interspace between stator bridges 5 of the stator segments. Stator yokes 6 of both stator segments 1 face and touch each other, so that the magnetic field is able to cross from a first stator segment 1 to a second stator segment 1 basically without interference.

Since the two stator segments 1 are rotated relative to each other by one half of the peripheral angle that exists between two most proximate two pole shoes in the circumferential direction, of a particular stator segment 1. The pole shoes of the two stator segments 1 thus alternate in the circumferential direction. In other words, each pole shoe of a first stator segment 1 is followed by a pole shoe of the other stator segment 1 in the circumferential direction.

Each stator segment 1 has two depressions 2, which are set apart from each other in the circumferential direction. Depressions 2 are preferably realized as slots that extend radially in stator yoke 6; the slots, in particular, are disposed on the axial end face pointing toward the other stator segment 1 of the phase segment.

Given a suitably selected angle of rotation, the slots of the two stator segments 1 of the phase segment become congruent and then jointly form a recess 51, especially a passage for outgoing line 22 and incoming line 21 of stator winding 20.

Since the two slots 2 are once again set apart from each other by one half of the peripheral angle that exists between two most proximate pole shoes of a particular stator segment 1 in the circumferential direction, the two slots 2 of a first stator segment become congruent with the two slots 2 of the other stator segment 1.

The slots are visible on the stack from radially outside as long as the stack has not been inserted in the housing component yet. As a result, a production machine equipped with image detection is able to detect these slots and use them for adjusting the relative angle of rotation between the phase segments of different phases, i.e., between the phase segments energized by different phase currents.

The phase currents, for example, are phase currents of a three-phase AC power system.

Figure 5:
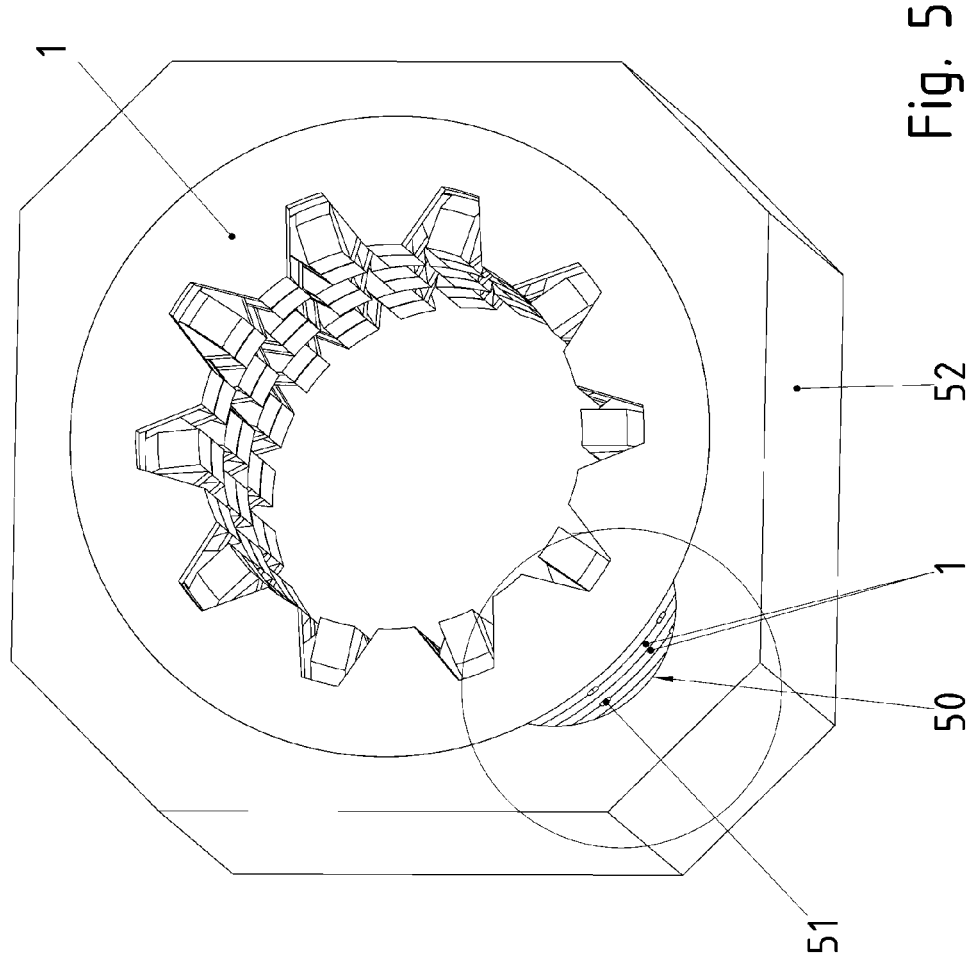
FIG. 5 shows a housing component 52, into which a stack of stator phase segments according to FIG. 3 has been inserted, an axially extending cable channel 50 being disposed inside housing component 52.
Figure 6:
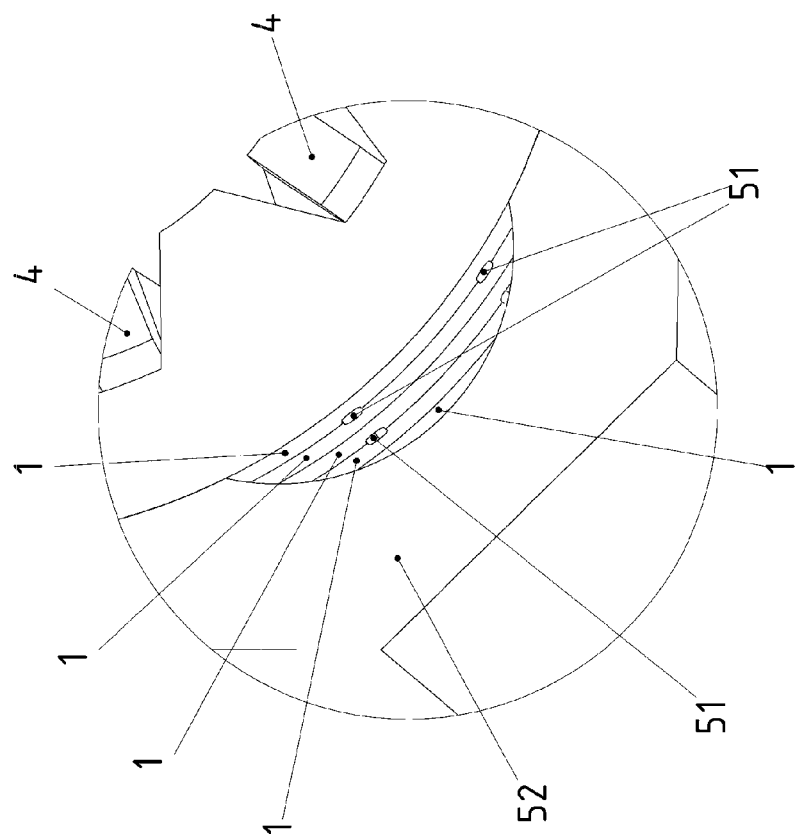
FIG. 6 shows an enlarged detail of FIG. 5.

As shown in FIG. 5, multiple phase segments, identically composed of two stator segments and one stator winding, are stacked one behind the other in the axial direction to form the electric machine, the phase segments being rotated relative to each other if they are energized by different phase currents (U, V, W).

Phase windings that belong to the same phase currents are not rotated, or are rotated to a lesser degree than if they were energized by different phase currents (U, V, W), or only by an integer multiple of the above-mentioned peripheral angle between the pole shoes of an individual stator segment 1.

The phase segments stacked on top of each other in the axial direction are in physical contact, and a thin electrically insulating layer may possibly be introduced between them. This thin electrically insulating layer improves the efficiency of the machine. The stack is accommodated in a recess of a housing component 52 holding the stack, housing component 52 preferably being connected by shrink-fitting and/or bonding, especially in a force-locking manner. To do so, prior to the connecting process, housing component 52 is brought to a higher temperature especially a temperature by at least 50 Kelvin or at least 100 Kelvin, than the stack. This makes it simple to insert the stack into housing component 52, and a force-locking connection is achieved following the temperature adjustment.

Housing component 52 is preferably made from metal, such as aluminum, for example.

The individual outgoing lines 22 and incoming lines 21 are routed to the outside in axially extending cable channel 50. Cable channel 50 is preferably developed as a groove in the inner wall of the receiving bore for the accommodation of the stack.

Stator segments 1 of each individual phase segment touch only at their axial front ends, in the region of stator yokes 6 that axially project in each others direction. A minimum air gap is maintained between the two stator segments 1 in the other surface regions. Instead of air, stator winding 20 and/or the molding compound and/or insulating paper are/is provided.

Figure 7:
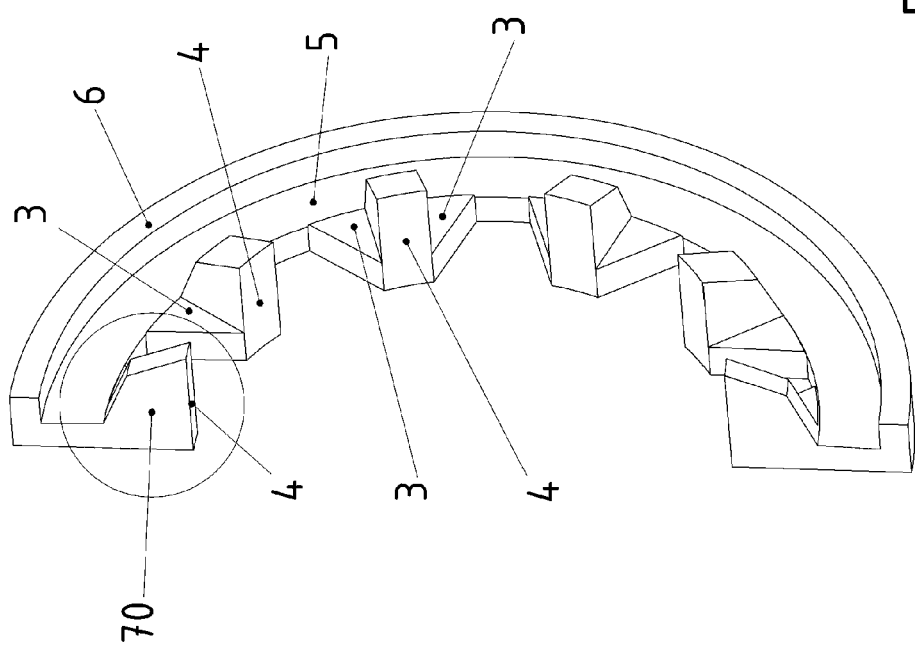
FIG. 7 shows a sectioned stator segment 1, in which a pole shoe has cut surface 70.
Figure 8:
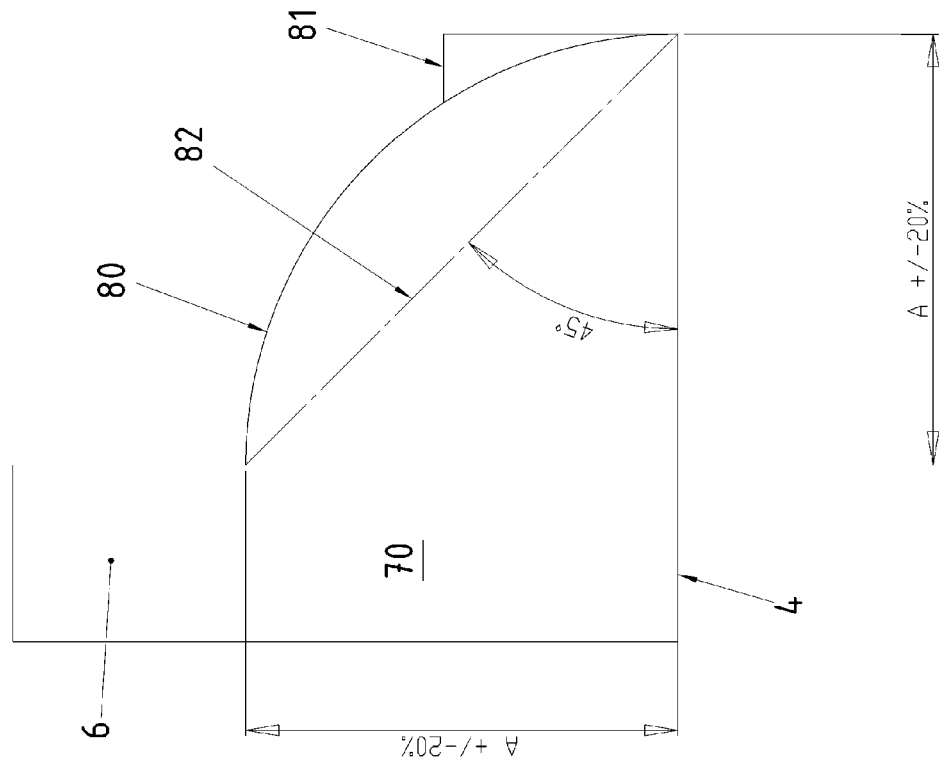
FIG. 8 shows cut surface 70 of the pole shoe from FIG. 7, but instead of the simplified surface profile of the pole shoe back composed of linear pieces, other profiles (80, 81, 82) are shown.

Cut face 70 of FIG. 7 is explained in FIG. 8. FIG. 8 explains the profile of the surface of pole shoe back 42. Depending on the desired production complexity, different profiles are selectable.

The linear, i.e., planar, profile 82 is especially easy to produce, but causes saturation of subregions of the pole shoe already at noncritical field intensities, even if area 4 has not yet gone into saturation.

In the case of bulbous profile 80, sectioned pole shoe back 42 takes the form of a circle segment.

The profiles of pole shoe backs 42 according to the present invention have a profile that lies between profiles 80 and 82. Pole shoe back 42 according to the present invention therefore has an essentially bulbous design, and the decrease in the pole shoe back with increasing radial clearance is accompanied by an increase in the lateral broadening in the circumferential direction.

Since the edge lying between pole shoe back 42 and area 4 is at risk of edge fracture, a reinforcement according to profile 81 or rounding in this area is advantageous.

The center point of the circle center associated with profile 80 lies at the corner of the equal-sided isoceles triangle associated with profile 82.

Pole shoe back 42 associated with profile 80 is therefore developed according to a cylinder wall segment. For FIG. 8 shows only the centrally disposed section.

Pole shoe back 42 associated with profile 82 therefore is developed according to a planar surface section. For FIG. 8 shows only the centrally disposed section.

Figure 9:
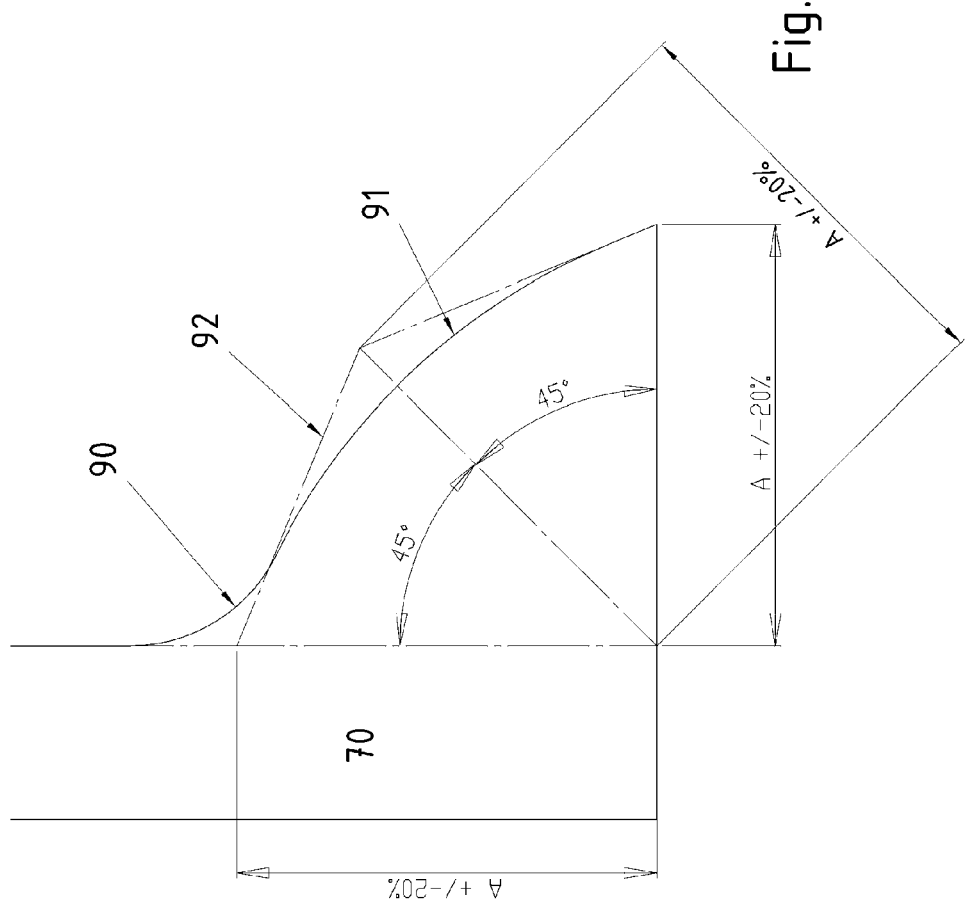
FIG. 9 shows a further profile 90, in which the edges are rounded.

Especially advantageous is the profile of the section of the pole shoe back shown in FIG. 9. Two linear segments are joined in profile 92, which have an angle between 0° and 90°, especially between 15° and 50°. In the section according to FIG. 9, the length of the two linear sections is identical or differs by less than 30%.

Since rounded regions reduce the risk of edge fractures, FIG. 9 shows such a profile. It has a first circular segment 90 and a second circular segment 91, and an uninterrupted smooth and differentiable transition exists between circular segments 90 and 91. The length, i.e., the arc length, of circular segment 90 amounts to between 10% and 50%, especially between 15% and 35%, of the length of circular segment 91.

Pole shoe back 42 has a similarly curved profile, since FIG. 9 shows only the centrally disposed section.

To improve the insulating clearance, insulating paper is situated between the individual stator segment 1 and stator winding 20. As an alternative, the winding is extrusion-coated by insulating plastic.

The circular arc segment in profile 90 is concave; the circular arc segment in profile 91 is convex. Profile 92 is implemented in simplified form, i.e., pole back 42 is composed of two planar surfaces.

The electric machine according to the present invention may therefore also be called a claw-pole type transversal flux machine.

In an additional exemplary embodiment according to the present invention, a temperature sensor is situated in the region of stator winding 20, whose terminal leads are likewise routed through passage 51.

LIST OF REFERENCE NUMERALS 1 stator segment
2 depression, especially slot
3 side surface, especially broadening in the circumferential direction
4 pole shoe surface, especially the pole shoe surface on the side of the air gap, i.e., the surface of the pole shoe facing the active component of the rotor
5 stator bridge
6 stator yoke
20 stator winding
21 incoming line
22 outgoing line
42 pole shoe back, especially having a bulbous design
43 transition surface
50 cable channel
51 recess, especially passage
52 housing component
70 cut surface
80 maximally bulbous profile of pole shoe back 42
81 edge reinforcement
82 minimally bulbous profile of pole shoe back 42, especially a linear, planar or straight profile
90 concave profile in the form of a circle segment
91 convex profile in the form of a circle segment
92 simplified profile, composed of two planar surfaces

The invention claimed is:

1. An electric machine, comprising:
a stator including a stack of phase segments, each phase segment including at least one stator segment and at least one stator winding; and
a plurality of pole shoes, each stator segment including an annular stator bridge on which the pole shoes are premolded, the pole shoes having the same shape, wherein:
an associated profile is disposed between a first and a second profile,
the first profile is a linear function of a radial clearance,
a pole back associated with the first profile is a planar surface,
the second profile is a circular function, and
a pole back associated with the second profile is a cylindrical section area.

2. The electric machine as recited in claim 1, wherein the electric machine is a transversal flux machine.

3. The electric machine as recited in claim 1, wherein the at least one stator winding includes a single winding.

4. The electric machine as recited in claim 1, wherein the pole shoes at least one of:
extend in a radially inward direction,
extend in a direction of a rotor, and
are situated between the rotor and the annular stator bridge.

5. The electric machine as recited in claim 1, wherein an axial width of each pole shoe decreases with increasing radial clearance.

6. The electric machine as recited in claim 1, wherein the circular function is a circular segment function.

7. The electric machine as recited in claim 1, wherein the pole shoe has a planar design on a side thereof facing away from another stator segment in order to allow a very tight and contacting design of the stack of the phase segments.

8. The electric machine as recited in claim 5, wherein an associated profile of the axial width as a function of the radial clearance is made up of two segments that are not parallel with each other, in which a pole back includes two planar surface pieces that are not parallel with each other.

9. The electric machine as recited in claim 8, wherein each segment not parallel with each other is a linear function of the radial clearance.

10. The electric machine as recited in claim 5, wherein an associated profile of the axial width as a function of the radial clearance includes a concave section and at least one of a bulbous section and a convex section, the concave section having an arc length that is at least five times shorter than the convex section.

11. The electric machine as recited in 1, wherein an air-gap-side surface of the pole shoe includes one of an area value of the same magnitude, and an area value that differs by maximally 20% in comparison with a transition area toward the stator bridge.

12. The electric machine as recited in claim 1, wherein the pole shoe has a pole back, the pole back at least one of at least partially facing in a direction of the stator winding and at least partially facing in a direction of the other stator segment, the pole back connecting an air-gap-side surface of the pole shoe facing a rotor, with the stator bridge, the pole back having a bulbous shape and being composed of two planar surface pieces that are not parallel with each other.

13. The electric machine as recited in claim 1, wherein the pole shoe is formed in such a way that essentially no subregion of the pole shoe goes into saturation as long as a surface area of a side surface of the pole shoe on the side of an air gap, corresponding to a side surface facing a rotor, does not go into saturation yet.

14. The electric machine as recited in claim 1, wherein the pole shoe has a width in a circumferential direction that increases with increasing radial clearance, wherein with the increasing radial clearance, a width in the circumferential direction increases.

15. The electric machine as recited in claim 14, wherein the width increases in inverse proportion essentially to an extent that an axial width decreases.

16. The electric machine as recited in claim 1, wherein at least one of:
the pole shoe is symmetrical with a plane of symmetry, the plane of symmetry running through a center of mass of the pole shoe and being defined by a radial direction starting at the center of mass, and the axial direction, and
the pole shoe is symmetrical with the plane of symmetry, the plane of symmetry running through the center of mass of the pole shoe, and a direction of a surface normal being a tangential direction at the center of mass.

17. The electric machine as recited in claim 1, wherein an edge of the pole shoe has a broader shape in order to reduce a risk of an edge fracture.

18. The electric machine as recited in claim 1, wherein with increasing radial clearance, an area value of a surface of intersection of the pole shoe with respect to a first area is essentially equal to an area value of an air-gap-side side surface corresponding to a side surface facing a rotor, of the pole shoe, or at least deviates by less than 10% or 20%, wherein one of:
a first surface being a tangential plane, at least one of:
which has individual radial clearance with respect to a rotor shaft axis,
which is aligned parallel to the rotor shaft axis,
which has a radial clearance,
which is aligned perpendicularly to an axis of symmetry, and
whose direction of normal connects the rotor shaft axis to a center of mass of the pole shoe, and
the first area being a cylinder sleeve area that at least one of has the individual radial clearance with respect to the rotor shaft axis and which is aligned parallel to the rotor shaft axis.

19. The electric machine as recited in claim 1, wherein the stack is accommodated in a housing component, and wherein the housing component has an axially extending cable channel, corresponding to an axially extending depression on its surface, corresponding to an inner surface, facing the stack, wherein the housing component is connected to the stack in a force-locking manner, and wherein the housing component is one of thermally shrink-fitted and bonded.

20. The electric machine as recited in claim 1, wherein each stator segment has two radially extending depressions, which are set apart from each other by one half of a pole shoe clearance in a circumferential direction, so that when joining two stator segments to form a phase segment, the depressions are able to be brought into congruence to form a passage for at least one of an incoming line and an outgoing line of the individual stator winding.

21. The electric machine as recited in claim 20, wherein the depressions include slots.

22. The electric machine as recited in claim 1, wherein the stator segment is made from pressed or sintered iron powder.

23. The electric machine as recited in claim 22, wherein the pressed or sintered iron powder includes SMC.

24. A method for producing an electric machine comprising:
a stator including a stack of phase segments, each phase segment including at least one stator segment and at least one stator winding; and
a plurality of pole shoes, each stator segment including an annular stator bridge on which the pole shoes are premolded, the pole shoes having the same shape, wherein:
an associated profile is disposed between a first and a second profile,
the first profile is a linear function of a radial clearance,
a pole back associated with the first profile is a planar surface,
the second profile is a circular function, and
a pole back associated with the second profile is a cylindrical section area, the method comprising:
during a production of the stack, a production machine at least one of detects and uses slots for aligning, including adjusting, a relative angle of rotation of the phase segments with respect to one another.

* * * * *

UNITED STATES PATENT AND TRADEMARK OFFICE
CERTIFICATE OF CORRECTION

| | |
|---|---|
| PATENT NO. | : 9,647,499 B2 |
| APPLICATION NO. | : 14/374093 |
| DATED | : May 9, 2017 |
| INVENTOR(S) | : Dreher et al. |

Page 1 of 1

It is certified that error appears in the above-identified patent and that said Letters Patent is hereby corrected as shown below:

On the Title Page

Item (12) "Dreher" should read -- Dreher, et al. --.

Item (72) Inventor is corrected to read:
-- Florian Dreher, Bruchsal, (DE);
Nejila Parspour, Gerlingen, (DE) --.

Signed and Sealed this
Seventeenth Day of September, 2019

Andrei Iancu
*Director of the United States Patent and Trademark Office*